(12) United States Patent
Yoshikawa et al.

(10) Patent No.: US 6,826,010 B2
(45) Date of Patent: Nov. 30, 2004

(54) SPINDLE MOTOR

(75) Inventors: Hiroshi Yoshikawa, Kitasaku-gun (JP); Hiroshi Sakaba, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 168 days.

(21) Appl. No.: 09/893,405

(22) Filed: Jun. 29, 2001

(65) Prior Publication Data

US 2002/0006012 A1 Jan. 17, 2002

(30) Foreign Application Priority Data

Jul. 13, 2000 (JP) ........................................ 2000-212706

(51) Int. Cl.$^7$ ............................................. G11B 17/02
(52) U.S. Cl. .................................................. 360/99.08
(58) Field of Search ................ 360/99.08, 97.01–97.04, 360/99.04, 99.12; 369/263, 264; 310/91

(56) References Cited

U.S. PATENT DOCUMENTS

| | | | | |
|---|---|---|---|---|
| 4,760,299 A | * | 7/1988 | Dickie et al. ................. | 310/91 |
| 5,365,388 A | * | 11/1994 | Maughan et al. ......... | 360/99.04 |
| 5,376,850 A | * | 12/1994 | Elsing et al. ............ | 360/98.07 |
| 5,481,144 A | * | 1/1996 | Dunfield et al. ......... | 360/99.08 |
| 5,504,638 A | * | 4/1996 | Kinoshita et al. ........ | 360/99.08 |
| 5,798,887 A | * | 8/1998 | Yoshida et al. .......... | 360/99.08 |

* cited by examiner

*Primary Examiner*—Allen Cao
(74) *Attorney, Agent, or Firm*—Oliff & Berridge, PLC

(57) ABSTRACT

In an outer rotor type spindle motor in which a shaft 2 and a stator 3 are supported by and fixed to a flange 1, damping members 4 and 5 are interposed between the flange 1 and the stator 3 and between the flange 1 and the shaft 2, or the flange 1 itself is formed of a damping material. Thus, electromagnetic vibration from the stator 3 or rotating vibration from the shaft 2 are damped and absorbed by the damping members 4 and 5. Accordingly, the generation of vibration or noise in the flange can be prevented which is caused by the transmission of the electromagnetic vibration generated on the stator due to an alternating current supplied to a stator coil or by the transmission of the rotating vibration of a rotor received by the shaft to the flange.

5 Claims, 3 Drawing Sheets

SPINDLE MOTOR

BACKGROUND OF THE INVENTION

1. Field of the Invention

The present invention relates to a spindle motor employed for rotating and driving a disk or the like.

2. Description of the Related Art

There has been conventionally known a motor of such a type that a stator is supported and fixed to a flange on which a shaft is fixedly supported and a rotor provided with a magnet in its inner periphery is rotatably supported by the shaft while the magnet is opposed with a predetermined interval to the outer periphery of the stator. In this motor, the rotor rotates on the outer periphery of the stator in accordance with the interaction between magnetic flux generated from a coil provided in the stator and magnetic flux generated from the magnet.

In such an outer rotor type spindle motor, since the outside diameter of the rotor becomes large in view of its structure, the moment of inertia thereof increases to reduce the unevenness of rotation. Therefore, this spindle motor is particularly suitable to a motor for rotating and driving a disk storage medium such as a magnetic disk used as a storage medium of a computer.

However, in the above mentioned conventional spindle motor, since each of the stator and the shaft comes into direct contact with the flange and is fixedly supported to the flange, there have been encountered such problems as mentioned below.

First, since the stator comes into direct contact with the flange and is fixedly supported to the flange, electromagnetic vibration and vibration caused from a rotating action which are generated in the stator by an alternating current supplied to the coil (stator coil) of the stator are directly transmitted to the flange.

Further, since the shaft comes into direct contact with the flange and is supported by and fixed to the flange, the vibration due to the rotation of the rotor which the shaft receives (rotating vibration) is, inconveniently, transmitted directly to the flange as it is.

Therefore, the electromagnetic vibration and the vibration caused from the rotating action from the stator and the rotating vibration from the shaft are both transmitted to the flange as they are, so that the vibration is doubled. Further, a larger vibration is sometimes generated due to the interaction of both the vibrations, or due to resonance with the flange or the like, which undesirably causes generation of noise.

SUMMARY OF THE INVENTION

The present invention was made in order to solve the problems of the above-mentioned prior art and it is an object of the present invention to provide a spindle motor in which the transmission of electromagnetic vibration and vibration caused from a rotating action from a stator or rotating vibration from a shaft to a flange can be suppressed and the generation of vibration, especially, the generation of large vibration or noise in the flange, can be prevented.

In order to achieve the above-mentioned object, according to a first aspect of the present invention, there is provided a spindle motor comprising: a flange for supporting and fixing a shaft; a stator supported by and fixed to the flange; and a rotor provided with a magnet in its inner periphery, the rotor being rotatably supported by the shaft in a condition where the magnet is opposed with a predetermined interval to the outer periphery of the stator, the rotor rotating in accordance with the interaction between magnetic flux from a coil provided in the stator and magnetic flux from the magnet, characterized in that a damping member is interposed between the flange and the stator.

According to a second aspect of the present invention, there is provided a spindle motor comprising: a flange for supporting and fixing a shaft; a stator supported by and fixed to the flange; and a rotor provided with a magnet in its inner periphery, the rotor being rotatably supported by the shaft in a condition where the magnet is opposed with a predetermined interval to the outer periphery of the stator, the rotor rotating in accordance with the interaction between magnetic flux from a coil provided in the stator and magnetic flux from the magnet, characterized in that a damping member is interposed between the flange and the shaft.

According to a third aspect of the present invention, there is provided a spindle motor comprising: a flange for supporting and fixing a shaft; a stator supported by and fixed to the flange; and a rotor provided with a magnet in its inner periphery, the rotor being rotatably supported by the shaft in a condition where the magnet is opposed with a predetermined interval to the outer periphery of the stator, the rotor rotating in accordance with the interaction between magnetic flux from a coil provided in the stator and magnetic flux from the magnet, characterized in that each of the shaft and the stator comes into direct contact with the flange and is supported by and fixed to the flange, and in that at least portions of the flange which are in contact with the shaft and the stator, respectively, are formed of damping material.

According to a fourth aspect of the present invention, the spindle motor of the first, the second, or the third aspect of the present invention is characterized in that the rotor can be loaded with a disk storage medium, and the spindle motor is configured in such a manner as to rotate and drive a disk.

In the spindle motor according to the first aspect of the present invention, the damping member is interposed between the flange and the stator, so that the electromagnetic vibration and the vibration caused from a rotating action which are generated on the stator due to an alternating current supplied to the coil of the stator (stator coil) can be damped and absorbed by the damping member and can be prevented from being transmitted to the flange.

In the spindle motor according to the second aspect of the present invention, since the damping member is interposed between the flange and the shaft, the rotating vibration of the rotor which the shaft receives is damped and absorbed by the damping member and can be prevented from being transmitted to the flange.

In the spindle motor according to the third aspect of the present invention, at least portions of the flange which are in contact with the shaft and the stator, respectively, are formed of damping material.

Accordingly, the shaft and the stator are merely mounted on the flange without taking a trouble to interpose the damping members respectively between the flange and the shaft, and between the flange and the stator, thereby obtaining the same effect as those provided by the first and second aspects of the present invention.

In the spindle motor according to the fourth aspect of the present invention, the disk storage medium can be mounted on the rotor so that the spindle motor of the present invention is configured as a motor for rotating and driving a disk.

Accordingly, there can be obtained a motor for rotating and driving the disk storage medium provided with a characteristic that the vibration from the stator or the rotor is damped and absorbed by the damping members or portions formed of damping material as well as a characteristic of small unevenness in rotation which is originally included in the outer rotor type spindle motor.

BRIEF DESCRIPTION OF THE DRAWINGS

Other characteristics will be apparent from the description which follows in reference to the attached drawings in which.

DETAILED DESCRIPTION OF THE PREFERRED EMBODIMENT

Now, an embodiment of the present invention will be described with reference to the accompanying drawings.

Figure 1:
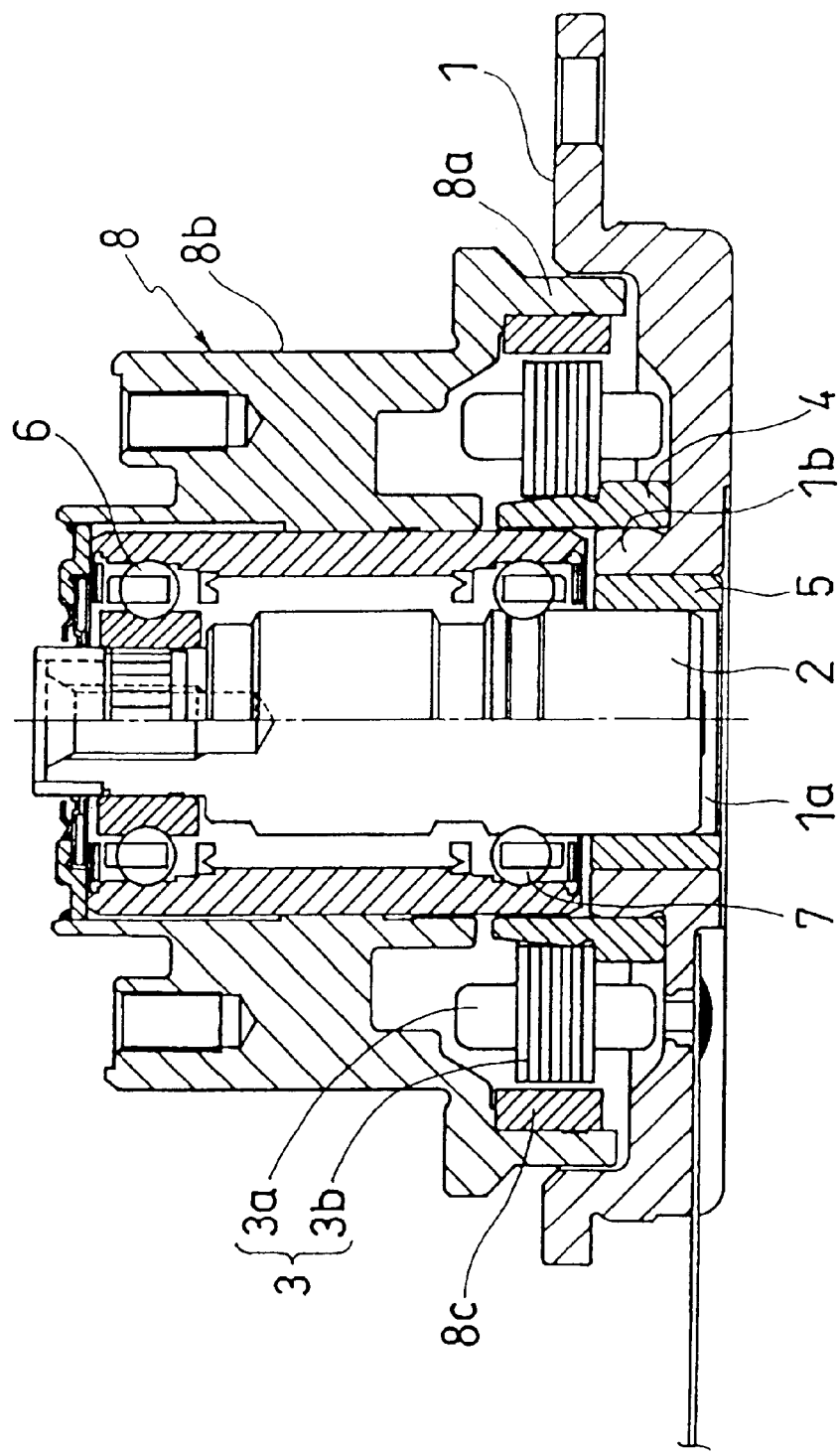
FIG. 1 is a longitudinal sectional view showing one embodiment of a spindle motor according to the present invention.

FIG. 1 is a longitudinal sectional view of one embodiment of a spindle motor according to the present invention.

In FIG. 1, the numeral 1 designates a flange serving as a motor base. To the flange 1, each of a shaft 2 and a stator 3 is fixed.

Figure 2:
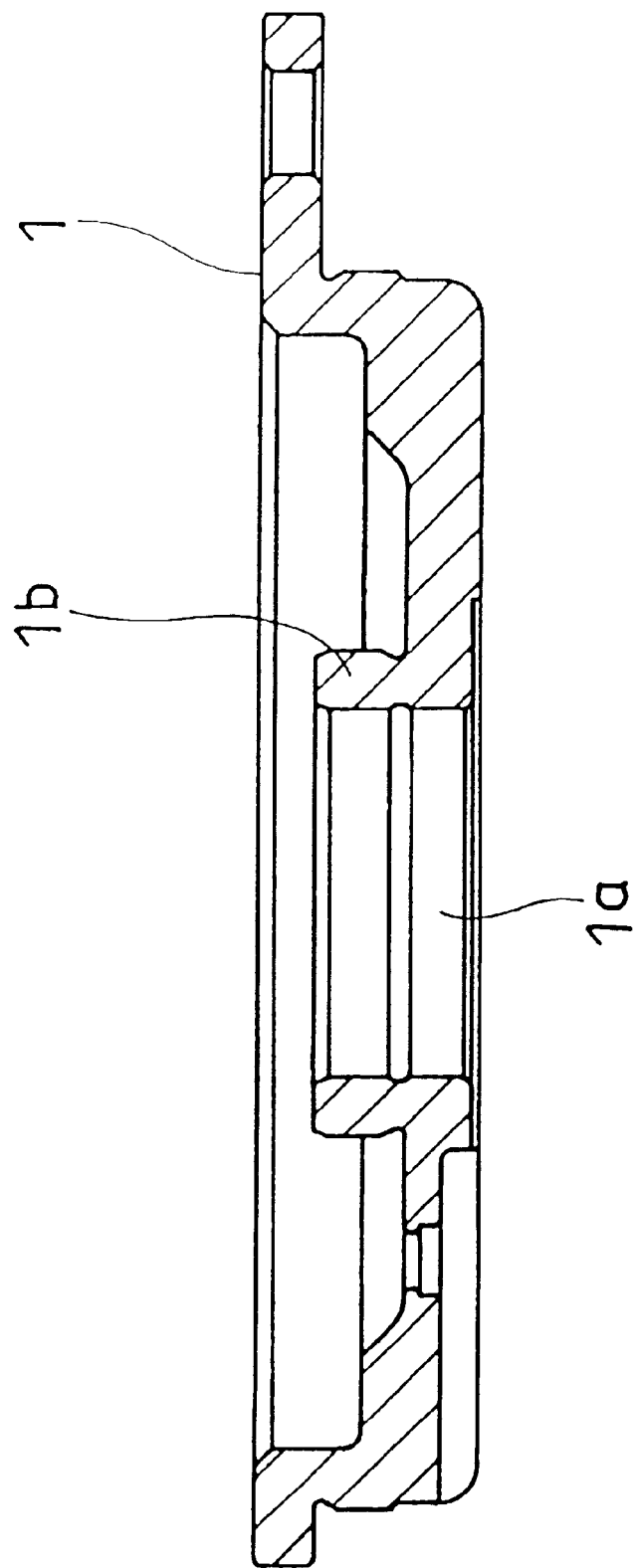
FIG. 2 is a sectional view showing a flange in FIG. 1 taken out.

As shown in FIG. 2 with the flange 1 taken out from FIG. 1, the flange 1 is formed substantially in the shape of a tray. A shaft support hole 1a is opened on the substantially central portion of the flange 1. On the peripheral edge of the hole 1a, is formed a ring shaped support portion 1b slightly protruding toward the front end side of the shaft 2 (upper side in the figure).

Figure 3:
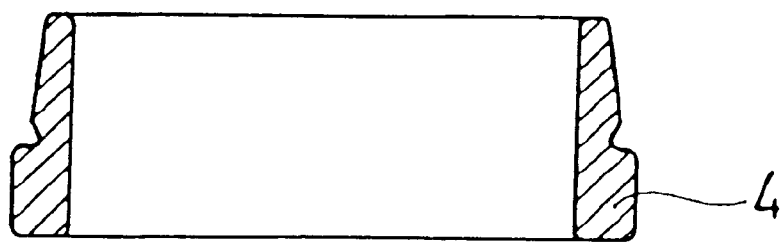
FIG. 3 is a sectional view similarly showing a first bush in FIG. 1 taken out.

Further, as illustrated in FIG. 1, the stator 3 is supported by and fixed to the outer periphery of the support portion 1b in the peripheral edge of the shaft support hole 1a opened on the flange 1 through a substantially cylindrical first bush 4 (see FIG. 3). Specifically, for example, the first bush 4 is initially fitted to the outer periphery of the support portion 1b, then, the stator 3 is fitted and fixed to the outer periphery (the outer periphery of an upper end side with a slightly small diameter) of the first bush 4, so that the stator 3 is supported by and fixed to the flange 1. This stator 3 mainly comprises a coil (stator coil) 3a and a core (stator core) 3b.

Figure 4:
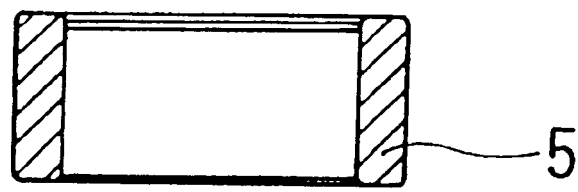
FIG. 4 is a sectional view similarly showing a second bush in FIG. 1 taken out.

The above-mentioned shaft 2 is supported and fixed into the shaft support hole 1a opened on the flange 1 through a cylindrical second bush 5 (see FIG. 4). Specifically, for example, the second bush 5 is initially fitted to the inner periphery of the shaft support hole 1a and then, the shaft 2 is fitted and inserted into the second bush 5 from an upper side in the drawing, so that the shaft 2 is supported by and fixed to the flange 1.

Both the first bush 4 and the second bush 5 are made of a damping material and constitutes damping members. As the damping material employed here, for example, there is exemplified "D2052" alloy (alloy comprising Mn and Cu as main components) produced by Daido Co., Ltd.

To the intermediate portion of the shaft 2, a rotor 8 is rotatably attached through bearings 6 and 7 arranged in two positions with a predetermined interval in the axial direction of the shaft. In the bearings 6 and 7 used here, while the outer rings of the bearings 6 and 7 are commonly formed, the inner ring of the bearing 6 is independent and the inner ring of the bearing 7 is formed integrally with the shaft 2. In this case, the bearings (not shown) whose inner rings and outer rings are both independent may be employed.

The lower end portion 8a of the rotor 8 in FIG. 1 is coaxially expanded more outward than an intermediate portion 8b, and a ring shaped permanent magnet 8c opposed with a predetermined interval to the stator core 3b is fixed to the inner periphery of the lower end portion 8a.

In the case where the motor of the present invention is employed as a motor for rotating and driving a disk storage medium such as a magnetic disk, an optical disk or a photomagnetic disk, the desired number of disks (not shown) are mounted on the outer periphery of the intermediate portion 8b. When a plurality of disks are mounted on the intermediate portion 8b of the rotor, they are laminated and mounted axially in the outer periphery direction of the intermediate portion 8b.

In the motor according to the present invention formed as mentioned above, when a predetermined alternating current is supplied to the stator coil 3a through a conductor wire (not shown), the rotor 8 rotates in accordance with the interaction between magnetic flux from the stator coil 3a and magnetic flux from the permanent magnet 8c.

At this time, since the alternating current is supplied to the stator coil 3a, electromagnetic vibration and vibration caused from a rotating action are generated in the stator 3. These vibrations tend to be transmitted to the flange 1 side. However, the first bush 4 of a damping member is interposed between the flange 1 and the stator 3, so that the vibrations are damped and absorbed by the first bush 4.

Further, in the shaft 2, vibration (rotating vibration) caused upon rotation of the rotor 8 is generated. This vibration tends to be transmitted to the flange 1 side. However, since the second bush 5 of a damping member is interposed between the flange 1 and the shaft 2, the vibration is damped and absorbed by the second bush 5.

As described above, when both the electromagnetic vibration and the vibration caused from the rotating action from the stator 3 and the rotating vibration from the shaft 2 are damped and absorbed by the bushes 4 and 5, a larger vibration may not be generated, nor noise may be generated due to the doubling of vibrations, the interaction of both the vibrations, or resonance with the flange 1 or the like.

In the above-mentioned embodiment, although the generation of vibration or noise of the flange 1 due to the electromagnetic vibration and the vibration caused from a rotating action from the stator 3 and the rotating vibration from the shaft 2 can be prevented by the bushes 4 and 5 of damping members that are separate from the flange 1, it should be noted that the flange 1 itself may be formed of damping material. Further, only portions of the flange 1 which are in contact with the shaft 2 and the stator 3, respectively, may be formed of damping material.

In both the examples in which all or only portions of the flange 1 are formed of damping material, since the stator 3 and the shaft 2 respectively come into direct contact with the flange 1 and are supported and fixed to the flange 1, separate parts such as the bushes 4 and 5 are not required so that the number of assembling works is reduced.

The damping member or damping material used in the motor of the present invention is not limited to that employed in the above embodiment.

The motor according to the present invention is also suitable for a scanner motor and so on, in addition to the motor for rotating and driving a disk storage medium.

As mentioned above, according to the present invention, since the electromagnetic vibration and the vibration caused from a rotating action from the stator or the rotating vibration from the shaft are damped and absorbed by the damping members, the generation of vibration in the flange, especially, the generation of large vibration or noise can be effectively prevented.

Further, when the motor of the present invention allows a disk storage medium to be mounted on the rotor, and the spindle motor is formed for rotating and driving a disk, the motor for rotating and driving the disk storage medium can be obtained, in which no vibration or noise is generated in the flange, because the vibration from the stator or the rotor is damped and absorbed by the damping member.

What is claimed is:

1. A spindle motor comprising:

a flange for supporting and fixing a shaft;

a stator supported by and fixed to said flange; and a rotor provided with a magnet in an inner periphery of the rotor, said rotor being rotatably supported by said shaft in a condition where said magnet is opposed with a predetermined interval to an outer periphery of said stator, said rotor rotating in accordance with an interaction between magnetic flux from a coil provided in said stator and magnetic flux from said magnet, wherein a damping member is interposed between said flange and said stator, wherein said damping member is made of an alloy having Mn and Cu as main components.

2. The spindle motor according to claim 1, wherein said rotor is loaded with a disk storage medium and said spindle motor is configured in such a manner as to rotate and drive a disk.

3. The spindle motor according to claim 1, wherein a damping member is further interposed between said flange and said shaft, wherein said damping member is made of an alloy having Mn and Cu as main components.

4. A spindle motor comprising:

a flange for supporting and fixing a shaft;

a stator supported by and fixed to said flange; and a rotor provided with a magnet in an inner periphery of the rotor, said rotor being rotatably supported by said shaft in a condition where said magnet is opposed with a predetermined interval to an outer periphery of said stator, said rotor rotating in accordance with an interaction between magnetic flux from a coil provided in said stator and magnetic flux from said magnet, wherein a damping member is interposed between said flange and said shaft, wherein said damping member is made of an alloy having Mn and Cu as main components.

5. The spindle motor according to claim 4, wherein said rotor is loaded with a disk storage medium and said spindle motor is configured in such a manner as to rotate and drive a disk.

* * * * *